United States Patent [19]

Grimmer

[11] Patent Number: 5,042,725
[45] Date of Patent: Aug. 27, 1991

[54] METHOD FOR RECOVERING PVC AND URETHANE FOAM FROM AUTOMOTIVE INTERIOR TRIM WASTE

[75] Inventor: Robert A. Grimmer, Berwick, Me.
[73] Assignee: Davidson Textron Inc., Dover, N.H.
[21] Appl. No.: 562,223
[22] Filed: Aug. 3, 1990
[51] Int. Cl.$^5$ .............................................. B02C 23/18
[52] U.S. Cl. ...................................... 241/19; 241/24; 241/79.1; 241/DIG. 38
[58] Field of Search ............... 241/19, 24, 79.1, 79.2, 241/DIG. 38; 209/127.4

[56] References Cited

U.S. PATENT DOCUMENTS

| | | | |
|---|---|---|---|
| 3,595,486 | 7/1971 | Stephanoff | 241/24 |
| 3,895,485 | 7/1971 | Dunbar | 241/79.2 X |
| 4,362,276 | 12/1982 | Morey | 241/DIG. 38 X |
| 4,570,861 | 2/1986 | Zengraf et al. | 241/DIG. 38 X |
| 4,809,854 | 3/1989 | Tomaszek | 241/DIG. 38 |

FOREIGN PATENT DOCUMENTS 239954 10/1986 Fed. Rep. of Germany ... 241/DIG. 38
3535633 4/1987 Fed. Rep. of Germany ... 241/DIG. 38

Primary Examiner—Mark Rosenbaum
Assistant Examiner—Frances Chin
Attorney, Agent, or Firm—John C. Evans

[57] ABSTRACT

A method for recovering vinyl and urethane foam from composite plastic articles for recycling by granulating the article to form separated mixed components destaticizing the separate mixed components to prevent static during cling between foam particles and vinyl shell particles; and directing the destaticized particles through a vibrating fluidized bed to separate the vinyl shell particles and the foam particles.

7 Claims, 2 Drawing Sheets

METHOD FOR RECOVERING PVC AND URETHANE FOAM FROM AUTOMOTIVE INTERIOR TRIM WASTE

FIELD OF THE INVENTION

This invention relates to methods for recycling plastic parts and more particularly to recycling the constituents of plastic composite parts.

BACKGROUND OF THE INVENTION

In order to reduce the need for landfill capacity to accommodate waste articles such as interior trim components for vehicles it has been proposed that the composite article be broken into smaller component particles and mixed in a liquid filled vessel. The mixing separates foam and vinyl components of the composite particles. The less dense foam particles are float separated by adding water to the vessel and the denser vinyl particles gravitate to the bottom of the vessel for collection at a bottom outlet. While satisfactory for its intended purpose, the method requires dewatering of the particles and subsequent drying, all of which add to the recycling costs.

Other processes are known to separate first and second components of a composite article or mixture.

One example of such prior art processes is a process for separating gold from ore. The process includes the step of air levitating crushed ore on a fluidizing bed and vibrating the bed to cause the heavier gold particles to be separated in one direction and the ore to be separated in another direction at two density fractions within the fluidizing bed. Such processes have the disadvantage of producing a waste slag which requires disposal in a landfill. Another example of two density fraction separation includes the separation of lead from lead acid batteries. In such case once the lead is separated the battery casings are landfilled due to acid contamination of the plastic in the casings. The same problem exists in reclaiming copper or aluminum wire with a plastic outer casing. Once the metal is reclaimed the outer casing is discarded because it is contaminated with small pieces of metal wire.

SUMMARY OF THE INVENTION

An object of the present invention is to provide a method for separating various constituents from a composite plastic article without use of liquid slurries or liquid separation vessels and by use of air levitation apparatus. The process includes steps to prevent cross contamination of the constituents which produce waste slag, or contaminated liquids requiring either disposal in a landfill or further refining and disposal.

A further object of the present invention is to provide an improved process for separating plastic shell material from plastic foam backing material by a process which will produce separation of the foam backing material and the shell material having less than 2% cross contamination and to do so without generating slag material or liquid waste requiring landfill or other disposal.

Still another object of the present invention is to recycle composite plastic, interior trim part waste wherein the trim part includes at least one plastic foam component and one plastic shell component by granulating the trim part to form trim waste particles less than ⅜ inch in greatest dimension in a mixed form of plastic foam and plastic shell material particles; thereafter destaticizing the plastic shell particles and the plastic foam particles to prevent static electricity attraction therebetween; and separating the destaticized plastic shell and plastic foam particles though an air stream for forming two density fractions with particles of a heavier density settling for separation in a first direction and with particles of a lesser density rising for separation in a direction opposite to the first direction.

A further feature of the present invention is to provide such a method of recycling wherein the method is further characterized by a granulation step which produces separate shell particles and separate plastic foam particles of like shape and size.

Another feature of the invention is to recycle interior trim parts having a layer of styrene joined to a plastic shell and to plastic foam; and wherein the separating step includes separating the separate plastic foam particles from a mixture of the styrene particles and the plastic shell particles; and applying a pressure to the mixture of plastic shell particles and the styrene particles to enlarge the shape of the styrene particles while retaining the granulated shape of the separate plastic shell particles and thereafter separating the enlarged styrene particles and the plastic shell particles by passing them through a fluidizing bed to air levitate the different sized particles into two density fractions and thereafter using a screen separator to remove the particles of one size from the particles of another size.

Still another feature of the invention is to recycle interior trim parts by a method as setforth above further characterized by the plastic article including a thin layer ionomer or equivalent plastic film, a layer of plastic foam, and a plastic shell; the granulating step including forming a mixture of individual particles of the plastic film, individual particles of the plastic foam and individual particles of the plastic shell; air separating the individual particles of the plastic shell from a mixture of individual particles of the plastic foam and individual particles of the plastic film and removing the mixture of individual particles of plastic foam and individual particles of the plastic film; applying an electrostatic charge on the mixture of particles of the plastic foam and particles of the plastic film and passing the charged particles with respect to a separating plate for removing the individual particles of plastic foam from individual particles of the plastic film.

These and other objects, advantages and features of the present invention will be more apparent when taken in conjunction with the following detailed description of the invention along with reference to the accompanying drawings wherein:

DETAILED DESCRIPTION OF PREFERRED EMBODIMENTS OF THE PRESENT INVENTION

Figure 1:
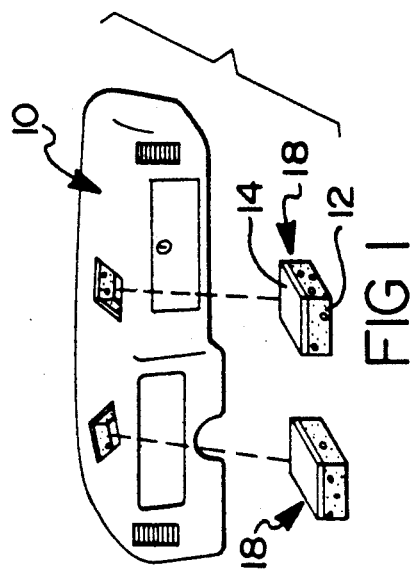
FIG. 1 is a diagrammatic view of an interior trim part including plural constituent plastic components recyclable by the method of the present invention.
Figure 2:
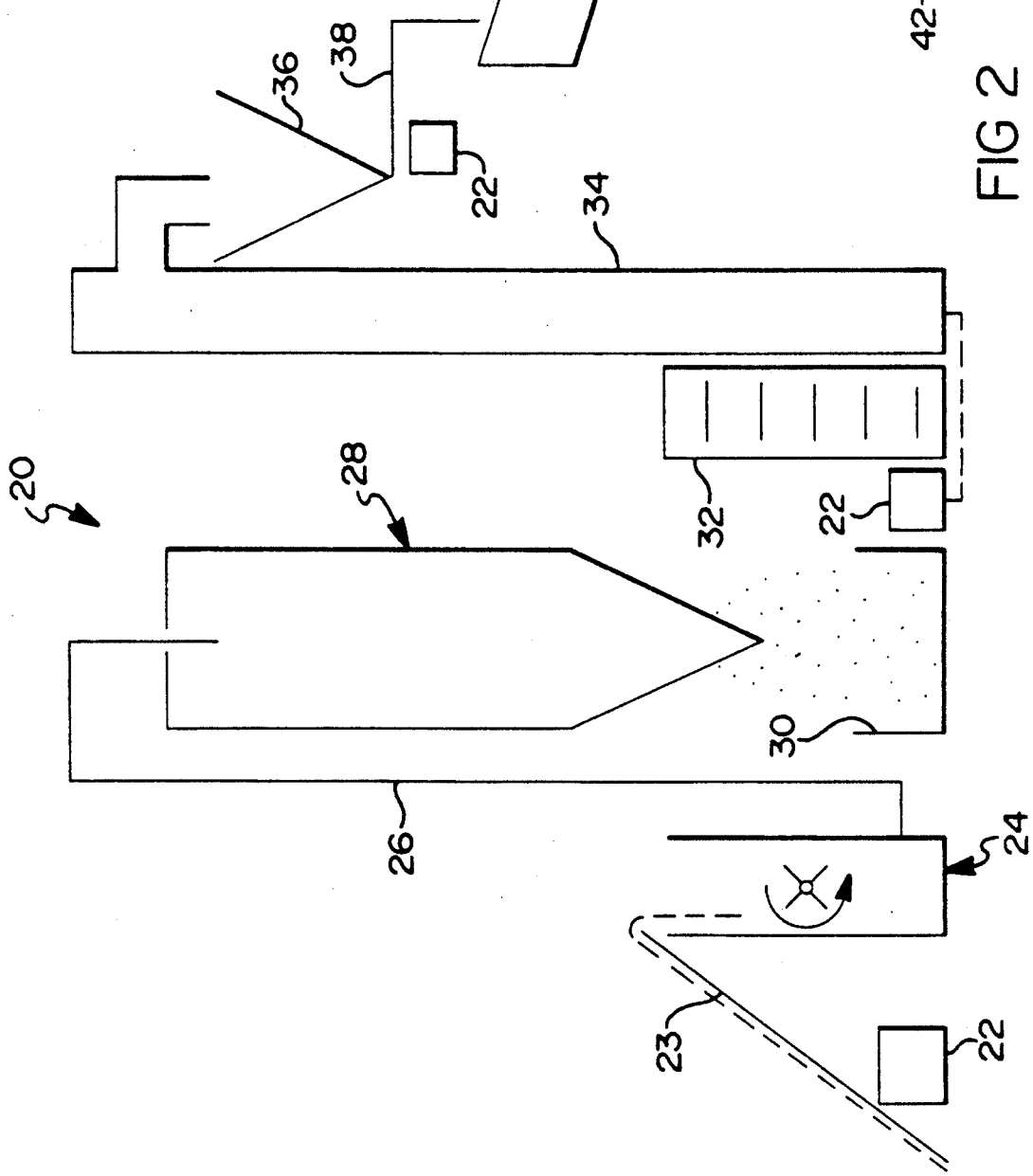
FIG. 2 is a diagrammatic view of a granulation apparatus used in the process of the present invention.

FIG. 1 shows a molded automotive instrument panel 10 of composite plastic construction. One constituent is a polyurethane foam backing 12 and a second constituent is an exterior skin 14 of polyvinyl chloride integrally joined thereto at an interface. The panel has cut out areas 16 for gages, radios, and air vents. Blocks 18 of polyurethane/vinyl composite are produced from the formation of the cut out areas 10. The shell or skin 14 can be formed from either urethane or plastisol materials including a thermoplastic resin and a suitable plasticizer, e.g., polyvinyl chloride or thermoplastic elastomers such as styrenic block copolymers, polyurethanes, copolyesters or polyolefins.

These waste blocks 18 are fed into a shredder or granulator 20 powered by a suitable electric motor driven drive system 22. By operation of the granulator 20, the blocks 18 are divided into a mixture of a plurality of separate foam and vinyl chips about ⅜ inch in each dimension.

More specifically, the granulator 20 includes a conveyor 23 which feeds the blocks to a 24 inch granulator in which the blocks 10 are broken into smaller particles. The smaller particles, e.g., less than ⅜ inch maximum dimension are then directed through a 10 inch air transfer trunk line 26 to the cyclone unit 28. The cyclone unit 28 separates the conveying air from the granulated particles of shell material and foam material. The separated particles of shell material and separate particles of foam material are then discharged as a mixture into a collection bin 30. The mixture of shell particles and foam particles are then carried by a conveyor 32 to a bucket lift type conveyor 34 for discharge into a raised feed hopper 36. The collected material in the feed hopper 36 is then carried by a conveyor 38 to a classifying screen 40 which sizes the mixture of foam and shell material particles into two particle sizes. The smaller particles are collected in a bin 42 and the larger particles are transferred by conveyor 43 to be collected in a bin 44.

Following granulation and separation the sized particles made up of individual bit of foam and individual bits of shell material are processed by a density separation process.

Figure 3:
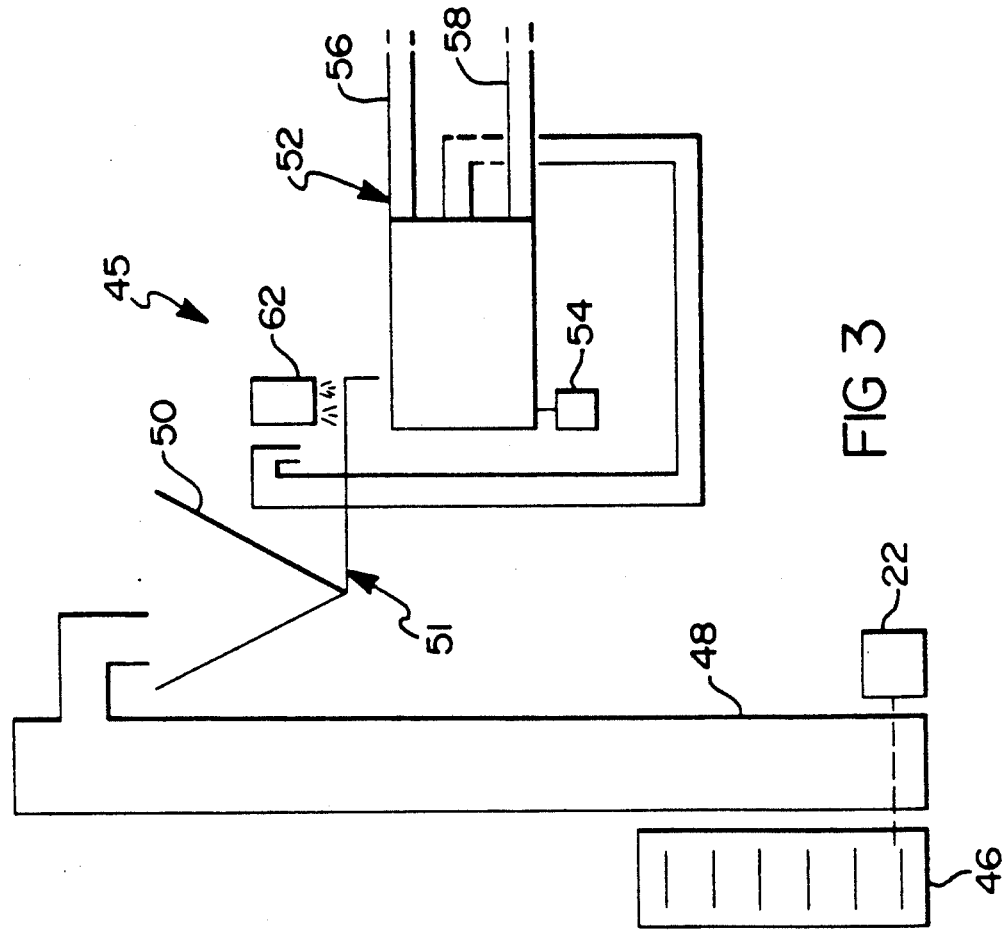
FIG. 3 is a diagrammatic view of density separation apparatus used in the process of the present invention.

Separation apparatus 45 for carrying out the density separation process is shown in FIG. 3 as including a feed conveyor 46, a vertical lift bucket conveyor 48 and an over head supply hopper 50. The individual bits of mixed foam and shell material particles are discharged from the hopper 50 and are fed across a conveyor 51 into a density separation fluidized bed table 52 having levitating air supplied thereto from a source 54.

The table 52 also includes a vibrator 52a to produce separation of the lighter foam particles from the heavier (more dense) shell material particles. The two density fractions formed in the table 52 direct the heavier shell material particles through an outlet 56 and the lighter foam particles are directed through an outlet 58. More particularly, the shell material being the denser of the two materials settles to the bottom of a vibrating screen 60 which carries the material forward for discharge through the outlet 56. The lighter foam particles are air levitated towards the back of the table 52 where they are collected and discharged through the outlet 58.

One problem with mechanical granulation and air density separation of vinyl and foam products is that a residual static electricity charge is generated on the foam and vinyl particles as they are conveyed through the granulator 20. Such static charging of the particles makes it difficult to separate them by the aforesaid air levitation and vibration process in the table 52. While it was observed that the outer shell or vinyl plastic particles had less than 1% of foam contamination, it was also observed that the separated urethane foam particles were heavily contaminated with thin pieces of vinyl making the urethane foam particle stream unsuitable for recycling.

Accordingly, one feature of the present invention is to provide an intermediate step between the granulator 20 and the separator apparatus for preventing cross contamination of the different materials. More specifically, in accordance with the present invention, a destaticizer 62 is located upstream of the fluidized bed table 52. The destaticizer 62 sprays a suitable agent on the mixed vinyl and urethane particles as they pass over the conveyor 51, e.g., polyethylene glycol monolaurate 2% in a water carrier. The spray is applied only in quantities to remove the static charge between the foam and shell material particles. Other observed forms of agents for destaticizing the foam and shell material particles is a high relative humidity chamber which surrounds the conveyor 51, e.g. >90% R.H., and known commercially available antistatic systems such as are used in home laundering to prevent static cling in materials such as StaticGuard manufactured by Alberto-Culver Co.

Figure 4:
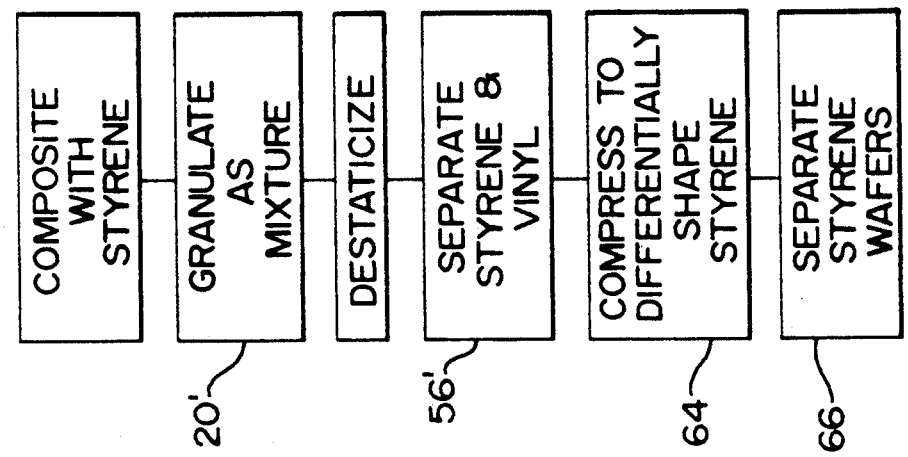
FIG. 4 is a flow chart of another embodiment of the method of the present invention.

Analysis of the output streams from the separating apparatus 45 demonstrates that the vinyl contamination of the foam particles is reduced to only 2% by weight of the urethane stream, a value which makes the urethane acceptably pure for recycling. Consequently, the process eliminates the production of a waste stream which must be landfilled. Another feature of the present invention is set-forth in the process of FIG. 4 in which the composite produce includes an outer plastic shell such as vinyl, a layer of urethane foam and a styrene insert. Blocks of the product are fed to a granulator 20' which granulates the blocks into separate particles of vinyl (or other like outer shell plastic material), urethane foam, and styrene. Following granulation and an air levitation process the particles of styrene and the particles of vinyl remain mixed and are passed out a separation stream 56'. The process includes passing the mixture of vinyl particles and styrene particles through a press 64 in which a pressure in the order of 15 tons (30,000 psi) is applied to the particles. The pressure causes the styrene particles or chips to be flattened into wafers 66. The vinyl chips however retain enough resiliency to retain a more granular shape. The resultant differences in shape enable the wafers 66 and the granular shaped vinyl particles to be redirected through the separation apparatus 45 to separate the vinyl from the styrene.

Figure 5:
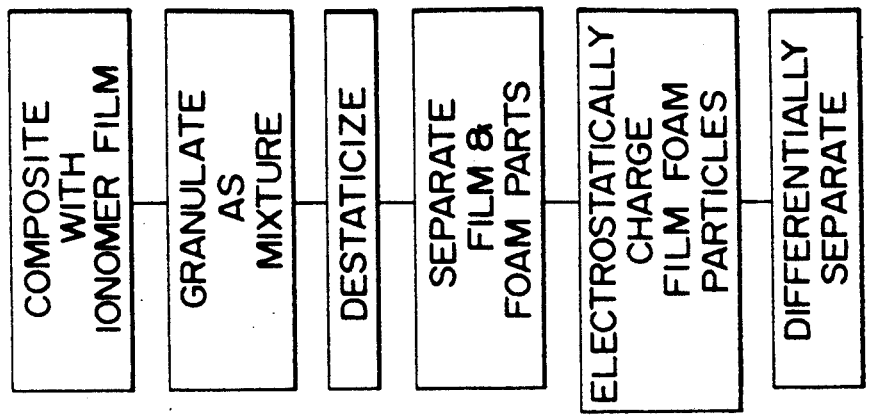
FIG. 5 is a flow chart of still another embodiment of the method of the present invention.

In yet another embodiment of the invention is shown in the process chart of FIG. 5 wherein the block component starting material includes a layer of ionomer film or its equivalent such as Surlyn, an ionomer film manufactured by Dupont Corporation of Wilmington, Del. The other constituents of the starting material includes an outer shell plastic such as polyvinyl chloride (vinyl covering or skin) and a layer of urethane foam. In this case the material is granulated to form three mixed particles including vinyl particles having a somewhat resilient characteristic because of plasticizers in the vinyl particles; foam particles and Surlyn film particles. The thin film particles mix with the foam during the separation process and are separated together in the stream 58 from the separation apparatus 45. The mixture of thin film ionomer particles and urethane foam particles are then subjected to electrostatic charging by applying an electrostatic charge on the individual particles of the plastic foam and on the individual particles of the plastic film. The particles of foam and particles of film receive different charge levels such that passing the differentially charged particles with respect to a separating plate will remove the individual particles of plastic foam from individual particles of the plastic film.

The foregoing is a complete description of preferred embodiments of the present invention. It should be understood, however, that various changes and modifications may be made without departing from the spirit and scope of the present invention as set forth in the following claims.

What is claimed is:

1. A method for recycling the component parts of a composite plastic article having a plastic shell with a layer of backing foam of lesser density than the plastic shell comprising the steps of:

granulating and separating the composite plastic article to form a contaminated mixture of separate plastic shell particles and separate plastic foam particles with the separate plastic shell particles retaining a contaminate constituent of the layer of backing foam of a first predetermined percentage by weight of the separate plastic shell particles and the separate foam particles retaining a contaminate constituent of thin pieces of the plastic shell having a greater percentage by weight of the separate foam particles than the percentage of the first predetermined percentage by weight;

destaticizing the contaminated mixture of separate plastic shell particles and the separate plastic foam particles to prevent static electricity attraction between the thin pieces of the plastic shell and the separate foam particles; and separating and contaminated mixture of separate plastic shell and separate foam particles by passing them through an air stream in a fluidized bed for forming two density fractions with particles of a heavier density settling for separation in a first direction and with particles of a lesser density rising for separation in a direction opposite direction and separating the destaticized contaminated constituent of thin pieces of the plastic shell from the separate plastic foam particles to reduce the greater percentage by weight of the thin pieces of the plastic shell to that of the separate plastic foam particles.

2. The method of claim 1 further characterized by said granulation step including providing a mixture of shell particles and plastic foam particles of like shape and size.

3. The method of claim 1 further characterized by the plastic article having a layer of styrene joined to said plastic shell and to said plastic foam;

said separating step including separating a mixture of styrene particles and plastic shell particles;

applying a pressure to the mixture of separated plastic shell particles and the styrene particles to enlarge the shape of the styrene particles while retaining a granulated shape of the separate plastic shell particles;

and thereafter repeating the separating step to separate styrene particles from plastic shell particles.

4. The method of claim 1 further characterized by the plastic article including a thin layer ionomer film, a layer of plastic foam, and a plastic shell;

said granulating step including forming a mixture of particles of the film, particles of the plastic foam and particles of the plastic shell;

air separating the particles of the plastic shell from a mixture of individual particles of the plastic foam and particles of the plastic film and removing the mixture of particles of the plastic foam and particles of plastic film;

differentially electrostatically charging the mixture of particles of the plastic foam and plastic film and passing the differentially charged particles with respect to a separating plate for removing particles of plastic foam from particles of plastic film.

5. The method of claim 1 wherein said destaticizing step includes spraying a liquid having a destaticizer agent therein against the separate contaminated streams of separate plastic shell particles and separate plastic foam particles.

6. The method of claim 1 wherein said destaticizing step includes the step of enclosing said separate contaminated streams of separate plastic shell particles and separate plastic foam particles within a chamber having a relative humidity of excess of 90%.

7. The method of claim 1 wherein said destaticizing step includes spraying a solution of polyethylene glycol monolaurate against the separate contaminated separate plastic shell particles and separate contaminated separate foam particles.

* * * * *